United States Patent
Park et al.

(10) Patent No.: US 12,116,645 B2
(45) Date of Patent: Oct. 15, 2024

(54) GRAIN-ORIENTED ELECTRICAL STEEL SHEET AND MAGNETIC DOMAIN REFINEMENT METHOD THEREOF

(71) Applicant: POSCO, Pohang-si (KR)

(72) Inventors: Se-Min Park, Pohang-si (KR);
Seong-Cheol Hong, Pohang-si (KR);
Hyun-Chul Park, Pohang-si (KR);
Jung-Moon Kang, Pohang-si (KR);
Chang-Ho Kim, Pohang-si (KR);
Won-Gul Lee, Pohang-si (KR);
Ki-Young Min, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 747 days.

(21) Appl. No.: 17/277,879

(22) PCT Filed: May 23, 2019

(86) PCT No.: PCT/KR2019/006220
§ 371 (c)(1),
(2) Date: Mar. 19, 2021

(87) PCT Pub. No.: WO2020/059999
PCT Pub. Date: Mar. 26, 2020

(65) Prior Publication Data
US 2022/0119901 A1 Apr. 21, 2022

(30) Foreign Application Priority Data
Sep. 21, 2018 (KR) .......... 10-2018-0114110

(51) Int. Cl.
*C21D 8/02* (2006.01)
(52) U.S. Cl.
CPC ......... *C21D 8/0226* (2013.01); *C21D 8/0205* (2013.01); *C21D 8/0236* (2013.01); *C21D 2201/05* (2013.01)

(58) Field of Classification Search
CPC .. C21D 8/0226; C21D 8/0205; C21D 8/0236; C21D 2201/05; C21D 9/46; C21D 8/12;
(Continued)

(56) References Cited

U.S. PATENT DOCUMENTS

| | | | |
|---|---|---|---|
| 4,904,312 A | 2/1990 | Beckley et al. | |
| 2013/0139932 A1* | 6/2013 | Sakai | H01F 41/0206 148/307 |

(Continued)

FOREIGN PATENT DOCUMENTS

| | | |
|---|---|---|
| CN | 105451902 A | 3/2016 |
| CN | 106795577 A | 5/2017 |

(Continued)

OTHER PUBLICATIONS

Extended European Search Report dated Oct. 26, 2021 issued in European Patent Application No. 19862367.0.
(Continued)

*Primary Examiner* — Anthony M Liang
*Assistant Examiner* — Danny N Kang
(74) *Attorney, Agent, or Firm* — Morgan, Lewis & Bockius LLP

(57) ABSTRACT

A grain-orientation electrical steel sheet according to an exemplary embodiment of the present invention includes a linear groove formed in a direction intersecting with the rolling direction, the groove includes the gradient section and the uniform section on a cross section including the transverse direction of the groove and the rolling surface normal direction of the steel sheet, and a length of the gradient section (GS) and the length of the uniform section (US) satisfy Equation 1 below.

$$0.1 \leq [GSL]/[USL] \leq 0.5 \qquad \text{[Equation 1]}$$

(Continued)

In Equation 1, [GSL] represents the length (mm) of the gradient section and [USL] represents the length (mm) of the uniform section.

6 Claims, 9 Drawing Sheets

(58) Field of Classification Search
CPC ......... C21D 10/00; H01F 1/16; H01F 41/024; H01F 1/14; B23K 26/352; B23K 2103/04
See application file for complete search history.

(56) References Cited

U.S. PATENT DOCUMENTS

| | | |
|---|---|---|
| 2014/0360629 A1 | 12/2014 | Inoue et al. |
| 2017/0369960 A1* | 12/2017 | Kwon ..................... C22C 38/04 |
| 2018/0043474 A1 | 2/2018 | Hamamura et al. |
| 2018/0066334 A1 | 3/2018 | Mogi et al. |

FOREIGN PATENT DOCUMENTS

| | | |
|---|---|---|
| JP | S57-002252 B2 | 1/1982 |
| JP | S58-005968 B2 | 2/1983 |
| JP | H05-202450 A | 8/1993 |
| JP | H06-057857 B2 | 8/1994 |
| JP | H07-072300 B2 | 8/1995 |
| JP | 2895670 B2 | 5/1999 |
| JP | 5938866 B2 | 6/2016 |
| JP | 2017-125250 A | 7/2017 |
| JP | WO 2016/171117 A1 | 11/2017 |
| JP | WO 2016/171124 A1 | 11/2017 |
| KR | 10-2009-0093487 A | 9/2009 |
| KR | 10-1141283 B1 | 5/2012 |
| KR | 10-2013-0128214 A | 11/2013 |
| KR | 10-2016-0019919 A | 2/2016 |
| KR | 10-1659350 B1 | 9/2016 |
| KR | 10-2017-0100006 A | 9/2017 |
| KR | 10-2018-0073306 A | 7/2018 |

OTHER PUBLICATIONS

Written Opinion and International Search Report dated Aug. 29, 2019 issued in International Patent Application No. PCT/KR2019/006220 (with partial English translation).

* cited by examiner

GRAIN-ORIENTED ELECTRICAL STEEL SHEET AND MAGNETIC DOMAIN REFINEMENT METHOD THEREOF

CROSS-REFERENCE OF RELATED APPLICATIONS

This application is the U.S. National Phase under 35 U.S.C. § 371 of International Patent Application No. PCT/KR2019/006220, filed on May 23, 2019, which in turn claims the benefit of Korean Application No. 10-2018-0114110, filed on Sep. 21, 2018, the entire disclosures of which applications are incorporated by reference herein.

TECHNICAL FIELD

The present invention relates to a grain-oriented electrical steel sheet and a magnetic domain refining method therefor. More specifically, the present invention relates to a grain-oriented electrical steel sheet and a magnetic domain refining method therefor that adjust a shape of a groove formed on a steel sheet.

BACKGROUND ART

Since a grain-oriented electrical steel sheet is used as an iron core material of an electrical device such as a transformer, in order to ameliorate energy conversion efficiency thereof by reducing power loss of the device, it is necessary to provide a steel sheet having excellent iron loss of the iron core material and a high occupying ratio when being stacked and spiral-wound.

The grain-oriented electrical steel sheet refers to a functional steel sheet having a texture (referred to as a "GOSS texture") of which a secondary-recrystallized crystal grain is oriented with a {110}<001> direction in a rolling direction through a hot rolling process, a cold rolling process, and an annealing process.

As a method of lowering the iron loss of the grain-oriented electrical steel sheet, a magnetic domain refining method is known. In other words, it is a method of refining a large magnetic domain contained in a grain-oriented electrical steel sheet by scratching or energizing the magnetic domain. In this case, when the magnetic domain is magnetized and a direction thereof is changed, energy consumption may be reduced more than when the magnetic domain is large. The magnetic domain refining methods include a permanent magnetic domain refining method, which retains an amelioration effect even after heat treatment, and a temporary magnetic domain refining method, which does not retain an amelioration effect after heat treatment.

The permanent magnetic domain refining method in which iron loss is ameliorated even after stress relaxation heat treatment at a heat treatment temperature or more at which recovery occurs may be classified into an etching method, a roll method, and a laser method. According to the etching method, since a groove is formed on a surface of a steel sheet through selective electrochemical reaction in a solution, it is difficult to control a shape of the groove, and it is difficult to uniformly secure iron loss characteristics of a final product in a width direction thereof. In addition, the etching method has a disadvantage in that it is not environmentally friendly due to an acid solution used as a solvent.

The permanent magnetic domain refining method using a roll is a magnetic domain refining technology that provides an effect of ameliorating iron loss that partially causes recrystallization at a bottom of a groove by forming the groove with a certain width and depth on a surface of a plate by pressing the roll or plate by a protrusion formed on the roll and then annealing the groove. The roll method has a disadvantage in that stability in machine processing decreases, there is reliability due to difficulty in securing stable iron loss depending on a thickness, a process is complex, and the iron loss and magnetic flux density characteristics deteriorate immediately after the groove formation (before the stress relaxation annealing).

The permanent magnetic domain refining method using a laser adopts a method in which a laser beam of high output is irradiated onto a surface portion of an electrical steel sheet moving at a high speed, and a groove accompanied by melting of a base portion is formed by the laser irradiation. A disadvantage is that when a groove having a predetermined depth or more is formed, a large amount of iron powder is generated, and some is fixed, some flips as dust, and some falls into an iron plate as powder, which causes a surface defect. As a groove depth increases, the iron loss decreases, but a free surface becomes wider than that when there is no groove, and as a result, a magnetic flux density, i.e., the quantity of magnetic lines passing per unit area decreases. That is, the amount of energy transfer is reduced compared to the related art. Even though energy efficiency through reduction of the iron loss increases, when the magnetic flux density decreases to a predetermined or more, there is a problem in that efficacy as a transformer is lost.

DISCLOSURE

Technical Problem

The present invention has been made in an effort to provide a grain-oriented electrical steel sheet and a magnetic domain refining method therefor. Specifically, the present invention has been made in an effort to provide a grain-oriented electrical steel sheet and a magnetic domain refining method therefor that improve an iron loss by adjusting a shape of a groove formed on a steel sheet and suppress deterioration of a magnetic flux density.

Technical Solution

An exemplary embodiment of the present invention provides a grain-oriented electrical steel sheet including: a linear groove formed in a direction intersecting with the rolling direction on one surface or both surfaces of a steel sheet, the groove includes the gradient section and the uniform section on a cross section including the transverse direction of the groove and the rolling surface normal direction of the steel sheet, and a length of the gradient section (GS) and the length of the uniform section (US) satisfy Equation 1 below.

$$0.1 \leq [GSL]/[USL] \leq 0.5 \quad \text{[Equation 1]}$$

In Equation 1, [GSL] represents the length (mm) of the gradient section and [USL] represents the length (mm) of the uniform section.

The gradient section means a portion in which an angle formed by a virtual line connecting the groove and straight lines of 1 mm left and 1 mm right of a boundary point of the steel sheet and the steel sheet surface is in the range of 30 to 90° on a cross section including the transverse direction of the groove and the rolling surface normal direction of the steel sheet, and the uniform section means a portion in which an angle formed by the virtual line and the steel sheet surface is 0° or more and less than 30°.

The length of the gradient section (GS) may be in the range of 15 to 100 mm.

The length of the uniform section (US) may be in the range of 100 to 250 mm.

An average angle ($\theta_{GA}$) formed by the steel sheet surface and the gradient section may be in the range of 25 to 50°.

An average angle formed by the steel sheet surface and the uniform section may be in the range of 0 to 10°.

A depth of the groove may be in the range of 3 to 30 m.

The transverse direction of the groove and the rolling direction of the steel sheet may form an angle of 75 to 88°.

In a range of 1 mm or less from the groove, the number of hill-ups per 100 μm may be 3 or more in a width direction of the steel sheet.

The steel sheet may include a solidification alloy layer formed on a lower portion of the groove, and the solidification alloy layer may include a recrystal having an average particle diameter of 1 to 10 m.

Another exemplary embodiment of the present invention provides a grain-oriented electrical steel sheet including: a linear groove formed in a direction intersecting with the rolling direction on one surface or both surfaces of the electrical steel sheet, the groove includes the gradient section and the uniform section on a cross section including the transverse direction of the groove and the rolling surface normal direction of the steel sheet, and a width of the gradient section (GS) and the width of the uniform section (US) satisfy Equation 2 below.

$$1.5 \le [GSW]/[USW] \le 2.0 \quad \text{[Equation 2]}$$

In Equation 2, [GSW] represents the width (μm) of the gradient section and [USW] represents the width (μm) of the uniform section.

The gradient section means a portion in which an angle formed by a virtual line connecting the groove and straight lines of 1 mm left and 1 mm right of a boundary point of the steel sheet and the steel sheet surface is in the range of 30 to 90° on a cross section including the transverse direction of the groove and the rolling surface normal direction of the steel sheet, and the uniform section means a portion in which an angle formed by the virtual line and the steel sheet surface is 0° or more and less than 30°.

The width of the uniform section (US) may be in the range of 10 to 100 μm.

The width of the gradient section (GS) may be in the range of 50 to 150 μm.

An average angle formed by the transverse direction of the groove and the gradient section may be in the range of 25 to 50°.

An average angle formed by the transverse direction of the groove and the uniform section may be in the range of 0 to 5°.

Yet another exemplary embodiment of the present invention provides a magnetic domain refining method of a grain-oriented electrical steel sheet, including: preparing a grain-oriented electrical steel sheet, and forming a groove on one surface of the grain-orientation electrical steel sheet by irradiating a laser in a direction intersecting with a rolling direction, in which the forming of the groove includes forming a gradient section and forming a uniform section, in the forming of the gradient section, a laser in which an average energy density is in the range of 0.05 to 0.5 J/mm$^2$ is irradiated, and in the forming of the uniform section, a laser in which the average energy density is more than 0.5 J/mm$^2$ to 5 J/mm$^2$ is irradiated.

A length of the gradient section (GS) and the length of the uniform section (US) satisfy Equation 1 below.

$$0.1 \le [GSL]/[USL] \le 0.5 \quad \text{[Equation 1]}$$

In Equation 1, [GSL] represents the length (mm) of the gradient section and [USL] represents the length (mm) of the uniform section.

In the forming of the gradient section, an energy density of the laser may increase toward boundary portions of the gradient section and the uniform section from an end of the groove.

In the forming of the gradient section, the energy density of the laser may increase to a range of 0.01 to 0.08 J/mm$^2$ per 1 mm toward the boundary portions of the gradient section and the uniform section from the end of the groove.

In a shape of a laser beam, the width may be in the range of 10 to 200 m and the length may be in the range of 300 to 5000 m.

Still yet another exemplary embodiment of the present invention provides a magnetic domain refining method of a grain-oriented electrical steel sheet, including: preparing a grain-oriented electrical steel sheet, and forming a groove on one surface of the grain-orientation electrical steel sheet by irradiating a laser in a direction intersecting with a rolling direction, in which the forming of the groove includes forming a gradient section and forming a uniform section, in the forming of the gradient section, a focal depth of the laser is more than 150 μm to 500 μm is irradiated, and in the forming of the uniform section, the focal depth of the laser is in the range of 0 to 150 m.

In the forming of the gradient section, the focal depth of the laser may decrease toward boundary portions of the gradient section and the uniform section from an end of the groove.

In the forming of the gradient section, the focal depth of the laser may decrease to a range of 1 to 10 m per 1 mm toward the boundary portions of the gradient section and the uniform section from the end of the groove.

Advantageous Effect

According to an implementation example of the present invention, a shape of a groove is appropriately controlled to improve an iron loss and suppress deterioration of a magnetic flux density.

MODE FOR INVENTION

Terms including first, second, and third are used for describing various arts, components, regions, layers, and/or sections, but are not limited thereto. The terms are only used to distinguish any part, component, region, layer, or section from the other part, component, region, layer, or section. Accordingly, the first part, component, region, layer, or section described below may be mentioned as the second part, component, region, layer, or section within the range without departing from the range of the present invention.

Special terms used herein are for the purpose of describing specific exemplary embodiments only and are not intended to limit the present invention. The singular forms used herein include plural forms as well, if the phrases do not clearly have the opposite meaning. The term "including" used in the specification means that a specific feature, region, integer, step, operation, element and/or component is embodied and existence or addition of other features, regions, integers, steps, operations, elements, and/or components are not excluded.

When any part is mentioned to be "on", "over" the other part, which might be directly on or over the other part or may be a different part interposed therebetween. On the contrary, when any part is mentioned as being "directly on" the other parts, the other part is not interposed therebetween.

Unless defined otherwise, all terms including technical and scientific terms used herein have the same meaning as commonly understood by those skilled in the art to which the present invention belongs. Commonly used predefined terms are further interpreted as having a meaning consistent with the relevant technical literature and the present disclosure, and are not to be construed as ideal or very formal meanings unless defined otherwise.

Hereinafter, an exemplary embodiment of the present invention will be described in detail so that those skilled in the art can easily carry out the exemplary embodiment. As those skilled in the art would realize, the described embodiments may be modified in various different ways, all without departing from the spirit or scope of the present invention.

Figure 1:
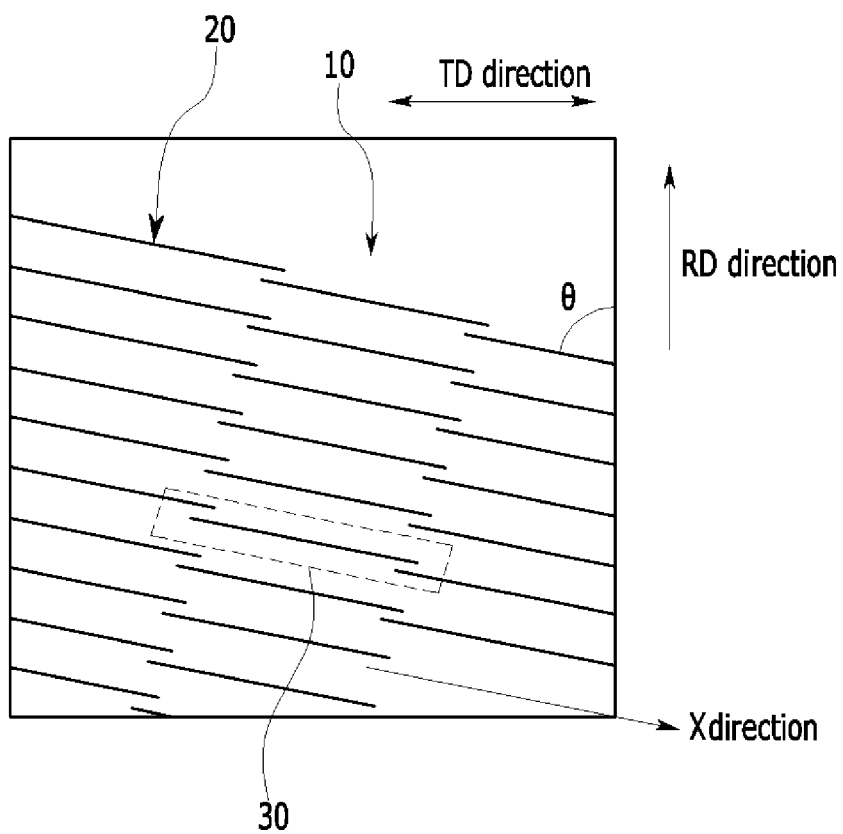
FIG. 1 is a schematic view of a rolling surface (ND surface) of a grain-oriented electrical steel sheet according to an exemplary embodiment of the present invention.

FIG. 1 illustrates a schematic view of a grain-oriented electrical steel sheet 10 of which magnetic domain is refined according to an exemplary embodiment of the present invention.

As illustrated in FIG. 1, the grain-oriented electrical steel sheet 10 according to an exemplary embodiment of the present invention includes: a linear groove 20 formed on one surface or both surfaces of the electrical steel sheet 10 in a direction intersecting with a rolling direction (RD direction).

As illustrated in FIG. 1, 2 to 10 linear grooves may be intermittently formed in a rolling vertical direction (TD direction, a steel sheet width direction). FIG. 1 illustrates a case where 3 linear grooves are intermittently formed in the rolling vertical direction (the TD direction, the steel sheet width direction).

As illustrated in FIG. 1, a transverse direction (X direction) of the groove and the rolling direction (RD direction) of the steel sheet may form an angle ($\theta$) of 75 to 88°. When forming the above-described angle, the formed angle may contribute to improving an iron loss of the grain-orientation electrical steel sheet.

Although not illustrated in FIG. 1, within a range of 1 mm or less from the groove, three or more hill-ups may be formed per 100 μm in a width direction of the steel sheet. This is caused by forming the groove through laser irradiation in an exemplary embodiment of the present invention. The range of 1 mm or less from the groove means a range of 1 mm or less vertically in the rolling direction (RD direction) with respect to the rolling surface (ND surface). The number of hill-ups aims at a hill-up in which a height is 1 m or more and a diameter is 1 μm or more. When the number of hill-ups is appropriately formed, the formed hill-ups may contribute to enhance an adhesion between the grain-oriented electrical steel sheets at the time of stacking the grain-oriented electrical steel sheets.

Although not illustrated in FIG. 1, the steel sheet may include a solidification alloy layer formed on a lower portion of the groove, and the solidification alloy layer may include recrystals having an average particle diameter of 1 to 10 μm. This is caused by forming the groove through laser irradiation in an exemplary embodiment of the present invention. When the solidification alloy layer and the recrystals in the solidification alloy layer are appropriately formed, it may contribute to improving the iron loss of the grain-orientation electrical steel sheet.

Figure 2:
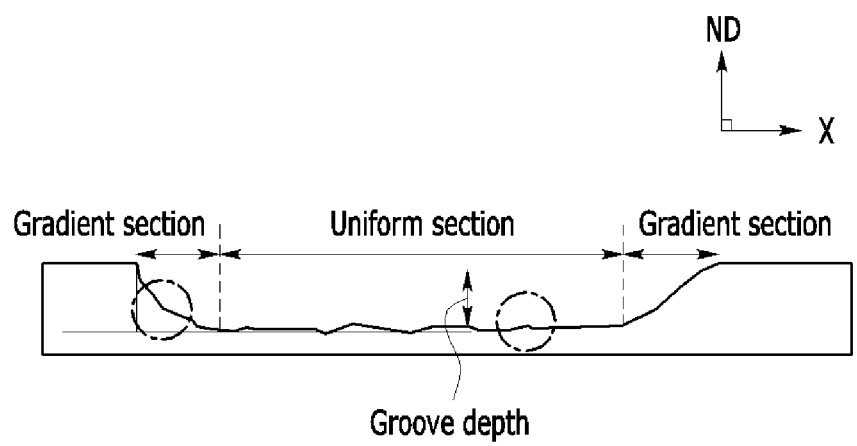
FIG. 2 is a schematic view of an ND direction-X direction surface of a grain-oriented electrical steel sheet according to an exemplary embodiment of the present invention.

FIG. 2, as an enlarged diagram of a portion represented by reference numeral 30 of FIG. 1, is a schematic view of an ND direction-X direction surface of a grain-oriented electrical steel sheet according to an exemplary embodiment of the present invention.

As illustrated in FIG. 2, the groove includes a gradient section (GS) and a uniform section (US) on a cross section including a transverse direction of the groove and a normal direction of the rolling surface of the steel sheet.

The gradient section (GS) means a portion in which an angle ($\theta_G$) formed by a virtual line connecting the groove and straight lines of 1 mm left and 1 mm right of a boundary point of the steel sheet and the steel sheet surface is in the range of 30 to 90° on a cross section including a transverse direction of the groove and a normal direction of the rolling surface of the steel sheet, and the uniform section means a portion in which an angle ($\theta_U$) formed by the virtual line and the steel sheet surface is 0° or more and less than 30°.

Figure 3:
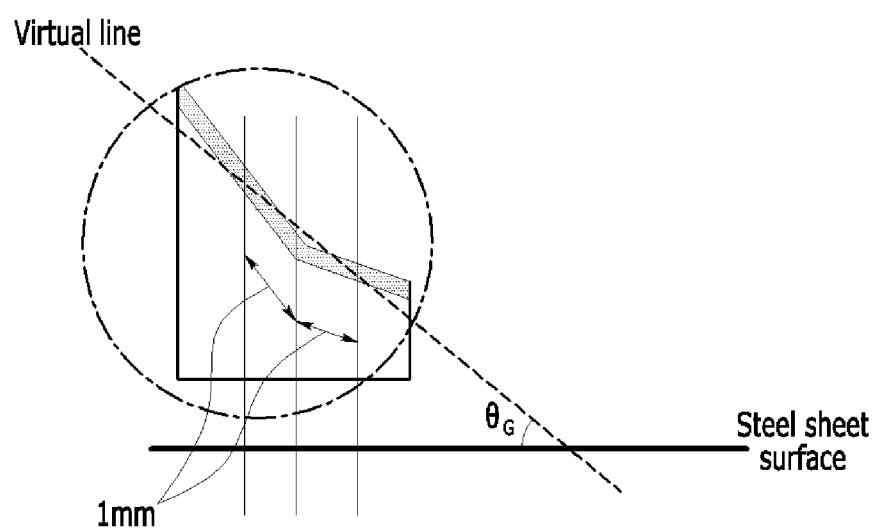
FIG. 3 is a partial enlarged diagram of a gradient section in FIG. 2.

FIG. 3 illustrates a partial enlarged diagram of the gradient section (GS). As illustrated in FIG. 3, the angle ($\theta_G$) formed by the virtual line connecting the groove and the straight lines of 1 mm left and 1 mm right of the boundary point of the steel sheet and the steel sheet surface is in the range of 30 to 90°. It is impossible to distinguish a portion separated less than 1 mm from both ends of the groove by a definition of the gradient section (GS) and the uniform section (US) described above, and it is considered that the corresponding portion corresponds to the gradient section (GS).

Figure 4:
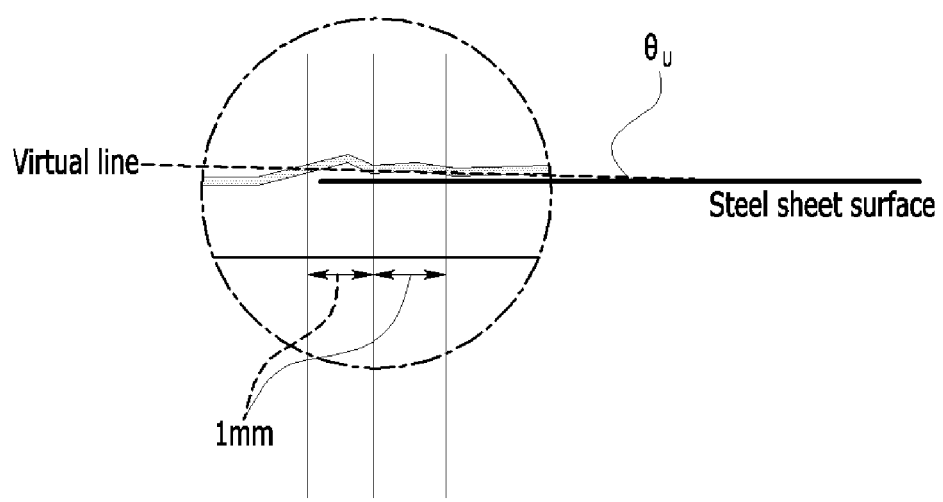
FIG. 4 is a partial enlarged diagram of a uniform section in FIG. 2.

FIG. 4 illustrates a partial enlarged diagram of the uniform section (US). As illustrated in FIG. 4, the angle ($\theta^U$) formed by the virtual line connecting the groove and the straight lines of 1 mm left and 1 mm right of the boundary point of the steel sheet and the steel sheet surface is 0° or more and less than 30°. Both ends of the uniform section (US) are in contact with the gradient section (GS), and a portion where the uniform section (US) and the gradient section (GS) are in contact with each other is referred to as a boundary portion.

In an exemplary embodiment of the present invention, by controlling the relationship between the length and the length of the uniform section (US) and the length of the gradient section (GS), the iron loss may be improved and the deterioration of the magnetic flux density may be suppressed. When the groove is formed by using multiple lasers, the gradient section (GS) is hardly formed and only the uniform section (US) is formed, like a "U" shape. However, when only the uniform section (US) is formed without the gradient section (GS) as described above, there is a problem in that the magnetic flux density deteriorates by the groove depth. In an exemplary embodiment of the present invention, the length of the gradient section and the length of the uniform section are formed to satisfy Equation 1 below to improve the iron loss and the deterioration of the magnetic flux density.

$$0.1 \leq [GSL]/[USL] \leq 0.5 \quad \text{[Equation 1]}$$

(In Equation 1, [GSL] represents the length (mm) of the gradient section and [USL] represents the length (mm) of the uniform section.)

When a value of Equation 1 is too small, that is, when the gradient section is not relatively appropriately obtained, there may be a problem in that the magnetic flux density deteriorates by the groove depth, as described above. When the value of Equation 1 is too large, that is, when the gradient section is formed relatively too long, an overall groove depth may not be secured, and as a result, iron loss improvement may be insufficient. More specifically, the value of Equation 1 may be in the range of 0.2 to 0.4.

As illustrated in FIG. 2, the gradient section or the uniform section is not continuously connected, but may be disconnected, and in this case, the length of the gradient section or the length of the uniform section means the sum of all gradient section or uniform section lengths in the groove.

The length of the gradient section (GS) may be in the range of 15 to 100 mm. When the length of the gradient section (GS) is too short, there may be a problem in that the magnetic flux density deteriorates by the groove depth. When the length of the gradient section (GS) is too long, the overall groove depth may not be secured, and as a result, the iron loss improvement may be insufficient. More specifically, the length of the gradient section (GS) may be in the range of 30 to 75 mm.

The length of the uniform section (US) may be in the range of 100 to 250 mm. When the length of the uniform section (US) is too short, the overall groove depth may not be secured, and as a result, the iron loss improvement may be insufficient. When the length of the uniform section (US) is too long, there may be a problem in that the magnetic flux density deteriorates by the groove depth. More specifically, the length of the gradient section (GS) may be in the range of 150 to 200 mm.

Figure 5:
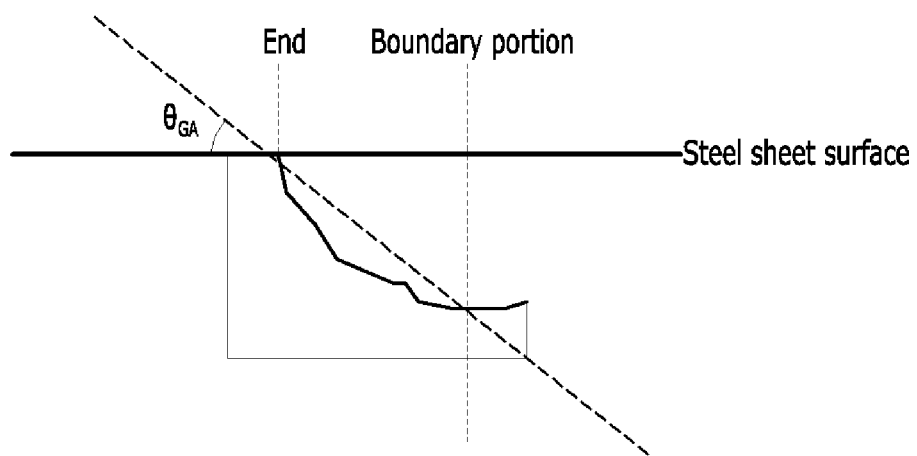
FIG. 5 is a diagram illustrating an average angle ($\theta_{GA}$) formed by a steel sheet surface and the gradient section.

An average angle ($\theta_{GA}$) formed by the steel sheet surface and the gradient section may be in the range of 25 to 50°. In this case, the average angle ($\theta_{GA}$) formed by the steel sheet surface and the gradient section means an angle ($\theta_{GA}$) formed by a virtual line passing through both ends of the gradient section, and the steel sheet surface. More specifically, the average angle ($O_{GA}$) means an angle ($\theta_{GA}$) formed by a virtual line passing through the groove end, and boundary portions of the gradient section and the uniform section, and the steel sheet surface. In FIG. 5, this is described. When there are a plurality of gradient sections, the average angle ($\theta_{GA}$) for each of the plurality of gradient sections may be in the range of 25 to 50°.

An average angle formed by the steel sheet surface and the uniform section may be in the range of 0 to 10°. In this case, the average angle formed by the steel sheet surface and the uniform section means an angle formed by a virtual line passing through both ends of the uniform section, and the steel sheet surface. More specifically, the average angle means an angle formed by a virtual line passing through both boundary portions of the gradient section and the uniform section, and the steel sheet surface. When there is a plurality of uniform sections, the average angle for each of the plurality of uniform sections may be in the range of 0 to 10°.

A depth ($G_D$) of the groove may be in the range of 3 to 30 μm. The depth ($G_D$) of the groove is described in FIG. 2. In the groove, the depth ($G_D$) means a longest length from the steel sheet surface in the ND direction. When the depth ($G_D$) of the groove is too shallow, iron loss improvement efficiency may deteriorate. On the contrary, when the depth ($G_D$) of the groove is too deep, the magnetic flux density may significantly deteriorate.

The grain-orientation electrical steel sheet according to an exemplary embodiment of the present invention includes a linear groove formed in a direction intersecting with the rolling direction on one surface or both surfaces of the electrical steel sheet, the groove includes the gradient section and the uniform section on a cross section including the transverse direction of the groove and the rolling surface normal direction of the steel sheet, and a width of the gradient section (GS) and the width of the uniform section (US) satisfy Equation 2 below.

$$1.5 \leq [GSW]/[USW] \leq 2.0 \quad \text{[Equation 2]}$$

In Equation 2, [GSW] represents the width (m) of the gradient section and [USW] represents the width (m) of the uniform section.

As such, the width of the gradient section is longer than the width of the uniform section, thereby improving the iron loss and suppressing the deterioration of the magnetic flux density. The width of the gradient section means the length of a portion in the gradient section, in which intervals formed by lines forming the groove is the longest with respect to the rolling surface (ND surface).

Figure 6:
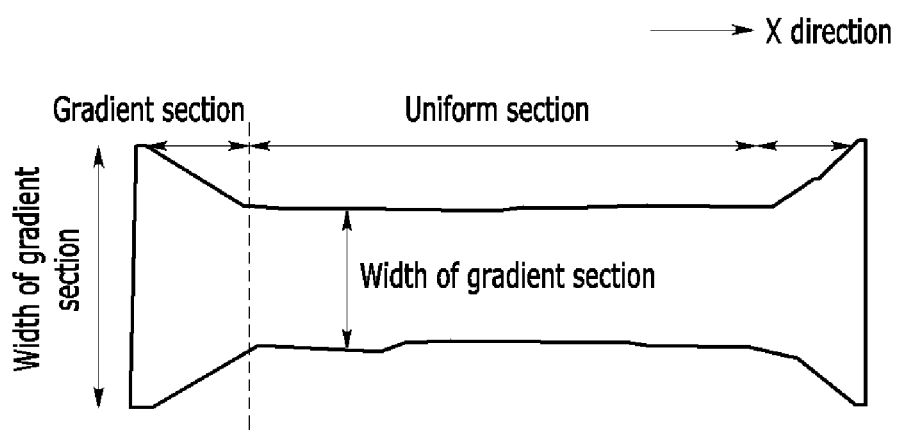
FIG. 6 is a schematic view of a rolling surface (ND surface) of a grain-oriented electrical steel sheet according to an exemplary embodiment of the present invention.

FIG. 6 is a schematic view of a rolling surface (ND surface) of a grain-oriented electrical steel sheet according to an exemplary embodiment of the present invention. In FIG. 6, the width of the gradient section (GS) and the width of the uniform section (US) are represented. In FIG. 6, the width of the gradient section (GS) is represented by a groove width on the groove end, but is not limited thereto.

When the value of Equation 2 is too small or too large, deterioration may occur in terms of the iron loss and the magnetic flux density. More specifically, the value of Equation 2 may be in the range of 1.65 to 1.85.

The width of the uniform section (US) may be in the range of 10 to 100 μm. When the width of the uniform section is too small or too large, it is difficult to satisfy the value of Equation 2 described above and deterioration may occur in terms of the iron loss and the magnetic flux density. More specifically, the width of the uniform section (US) may be in the range of 30 to 70 μm.

The width of the gradient section (GS) may be in the range of 50 to 150 μm. When the width of the uniform section is too small or too large, it is difficult to satisfy the value of Equation 2 described above and deterioration may occur in terms of the iron loss and the magnetic flux density. More specifically, the width of the gradient section (GS) may be in the range of 80 to 100 μm.

Figure 7:
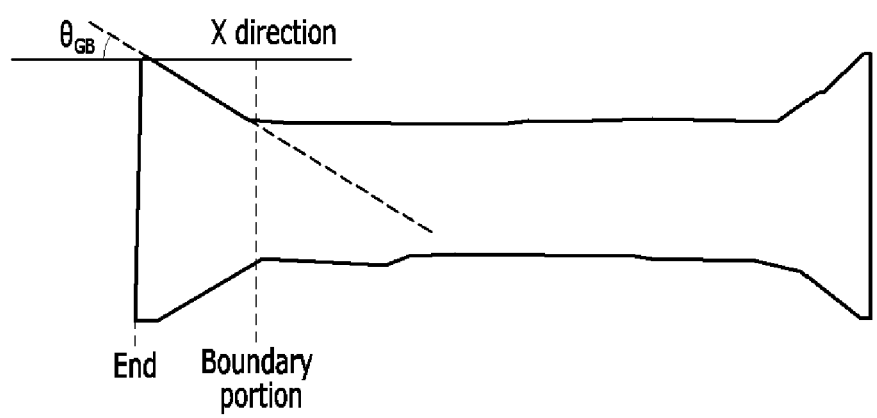
FIG. 7 is a schematic view of a rolling surface (ND surface) of a grain-oriented electrical steel sheet according to an exemplary embodiment of the present invention.

An average angle ($\theta_{GB}$) formed by a groove transverse direction (X direction) and the gradient section may be in the range of 25 to 50°. The average angle ($\theta_{GB}$) formed by the groove transverse direction and the gradient section means an angle ($\theta_{GB}$) formed by the virtual line passing through both ends of the gradient section, and the groove transverse direction. More specifically, the average angle ($\theta_{GB}$) means an angle ($\theta_{GB}$) formed by the virtual line passing through the groove end, and the boundary portions of the gradient section and the uniform section, and the groove transverse direction. In FIG. 7, this is described. When there is the plurality of gradient sections, the average angle ($\theta_{GB}$) for each of the plurality of gradient sections may be in the range of 25 to 50°.

An average angle formed by the groove transverse direction (X direction) and the uniform section may be in the range of 0 to 5°. In this case, the average angle formed by the groove transverse direction and the uniform section means an angle formed by the virtual line passing through both ends of the uniform section, and the steel sheet surface. More specifically, the average angle means an angle formed by a virtual line passing through both boundary portions of the gradient section and the uniform section, and the groove transverse direction. When there is the plurality of uniform sections, the average angle for each of the plurality of uniform sections may be in the range of 0 to 5°.

A magnetic domain refining method of the grain-orientation electrical steel sheet according to an exemplary embodiment of the present invention includes: preparing a grain-orientation electrical steel sheet 10; and forming a groove on one surface of the grain-orientation electrical steel sheet by irradiating a laser in a direction intersecting with a rolling direction.

First, the grain-orientation electrical steel sheet 10 is prepared. In an exemplary embodiment of the present invention, there is a feature in the magnetic domain refining method and a shape of the formed groove 20, and the grain-orientation electrical steel sheet which is an object to be subjected to magnetic domain refining may be used without a limit. In particular, an effect of the present invention is expressed regardless of an alloy composition of the grain-orientation electrical steel sheet. Therefore, a specific description of the alloy composition of the grain-orientation electrical steel sheet will be omitted.

In an exemplary embodiment of the present invention, the grain-orientation electrical steel sheet rolled with a predetermined thickness through hot rolling and cold rolling from a slab may be used. Alternatively, after the cold rolling, it is also possible to use a grain-orientation electrical steel sheet having a base coating layer in a final annealing process, and a grain-orientation electrical steel sheet having an insulating film layer further formed on the base coating layer.

As described above, in an exemplary embodiment of the present invention, the shape of the groove is controlled to improve the iron loss and suppress the deterioration of the magnetic flux density. As a specific method, the magnetic domain refining method includes forming the groove on one surface of the grain-orientation electrical steel sheet by irradiating the laser in the direction intersecting with the rolling direction, and the forming of the groove includes forming the gradient section and the forming the uniform section. When the gradient section and the uniform section are formed, the gradient section and the uniform section may be formed in the above-described shapes by differently adjusting an energy density of the laser. Since the shapes of the gradient section and the uniform section are the same as those in the above description, a duplicated description is omitted.

Specifically, in the forming of the gradient section, a laser in which an average energy density is in the range of 0.05 to 0.5 J/mm² is irradiated, and in the forming of the uniform section, a laser in which the average energy density is more than 0.5 J/mm² to 5 J/mm² is irradiated. As illustrated in FIG. 2, the forming of the gradient section or the forming of the uniform section may be included a plurality of numbers of times such as 2 times or more. In FIG. 2, the forming of the gradient section, the forming of the uniform section, and the forming of the gradient section are performed.

In the forming of the gradient section, the laser in which the average energy density is in the range of 0.05 to 0.5 J/mm² may be irradiated. When the energy density is too low or high, an appropriate gradient section is not formed. More specifically, in the forming of the gradient section, the laser in which the average energy density is in the range of 0.1 to 0.3 J/mm² may be irradiated.

In the forming of the uniform section, the laser in which the average energy density is more than 0.5 J/mm² to 5 J/mm² may be irradiated. When the energy density is too low or high, an appropriate uniform section is not formed. More specifically, in the forming of the uniform section, the laser in which the average energy density is in the range of 1 to 3 J/mm² may be irradiated.

Figure 8:
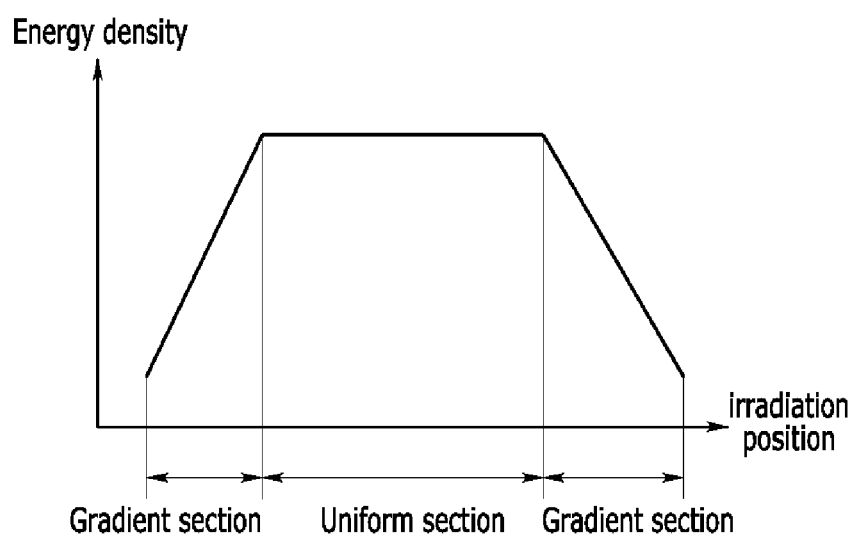
FIG. 8 is a graph showing a relationship of an irradiation position and a laser energy density.

FIG. 8 is a graph showing a relationship of an irradiation position and a laser energy density. As illustrated in FIG. 8, in the forming of the gradient section, the energy density of the laser may increase toward the boundary portions of the gradient section and the uniform section from the end of the groove. More specifically, in the forming of the gradient section, the energy density of the laser may increase to a range of 0.01 to 0.08 J/mm² per 1 mm (GSL) toward the boundary portions of the gradient section and the uniform section from the end of the groove.

When an increase degree is too small, there may be a problem in that the length of the gradient section becomes relatively larger. When the increase degree is too large, there may be a problem in that the length of the gradient section becomes relatively smaller. In an exemplary embodiment of the present invention, the average energy density means an average of the energy density for the length of the gradient section or the uniform section.

In a shape of a laser beam, the width may be in the range of 10 to 200 μm and the length may be in the range of 300 to 5000 μm. By appropriately controlling the width and the length of the laser beam, a groove having an appropriate shape may be formed. The shape of the laser beam is elliptical, and the length means a long axis of an ellipse in the groove transverse direction and the width means a short axis of the ellipse in a direction perpendicular to the transverse direction.

As described above, in an exemplary embodiment of the present invention, the shape of the groove is controlled to improve the iron loss and suppress the deterioration of the magnetic flux density. As a specific method, the magnetic domain refining method includes forming the groove on one surface of the grain-orientation electrical steel sheet by irradiating the laser in the direction intersecting with the rolling direction, and the forming of the groove includes forming the gradient section and the forming the uniform section. When the gradient section and the uniform section are formed, the gradient section and the uniform section may be formed in the above-described shapes by differently adjusting a focal depth of the laser. Since the shapes of the gradient section and the uniform section are the same as those in the above description, a duplicated description is omitted.

Specifically, in the forming of the gradient section, a laser in which the average focal depth is more than 150 m to 500 μm is irradiated, and in the forming of the uniform section, a laser in which the average focal depth is in the range of 0 to 150 μm is irradiated. As illustrated in FIG. 2, the forming of the gradient section or the forming of the uniform section may be included a plurality of numbers of times such as 2 times or more. In FIG. 2, the forming of the gradient section, the forming of the uniform section, and the forming of the gradient section are performed.

The focal depth means a distance between a focus of the laser and the surface of the grain-orientation electrical steel sheet. A case where the focal depth is closer to 0 means that the focus is accurately taken on the surface of the grain-orientation electrical steel sheet. The laser focus may be formed inside grain-orientation electrical steel sheet or outside the grain-orientation electrical steel sheet.

In the forming of the gradient section, the laser in which the average focal depth is more than 150 μm to 500 μm may be irradiated. When the average focal depth is too low or high, the appropriate gradient section is not formed. More specifically, in the forming of the gradient section, the laser in which the average focal depth is more than 200 to 500 μm may be irradiated.

In the forming of the uniform section, a laser in which the average depth is in the range of 0 to 150 μm may be irradiated. When the focal depth is too large, the appropriate uniform section is not formed. More specifically, in the forming of the uniform section, a laser in which the focal depth is in the range of 50 to 130 μm may be irradiated.

Figure 9:
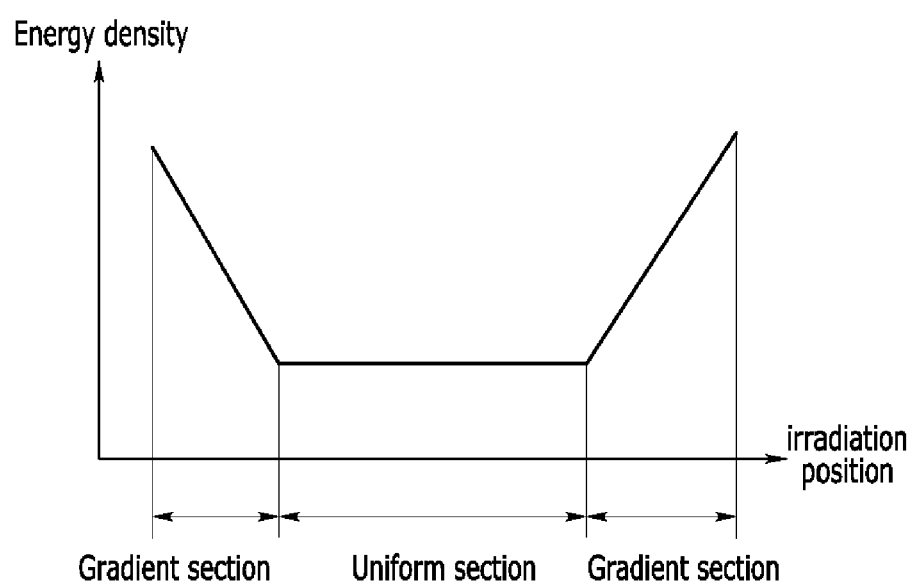
FIG. 9 is a graph showing a relationship of the irradiation position and a laser focal depth.

FIG. 9 is a graph showing a relationship of an irradiation position and a laser focal depth. As illustrated in FIG. 9, in the forming of the gradient section, the focal depth of the laser may decrease toward the boundary portions of the gradient section and the uniform section from the end of the groove. More specifically, in the forming of the gradient section, the focal depth of the laser may decrease to a range of 1 to 10 μm per 1 mm (GSL) toward the boundary portions of the gradient section and the uniform section from the end of the groove.

When a decrease width is too small or large, there may be a problem in that a gradient section having an appropriate shape may not be formed. In an exemplary embodiment of the present invention, the average focal depth means an average of the focal depth for the length of the gradient section or the uniform section.

In a shape of a laser beam, the width may be in the range of 10 to 200 μm and the length may be in the range of 300 to 5000 μm. By appropriately controlling the width and the length of the laser beam, a groove having an appropriate shape may be formed. The shape of the laser beam is elliptical, and the length means a long axis of an ellipse in the groove transverse direction and the width means a short axis of the ellipse in a direction perpendicular to the transverse direction.

Hereinafter, the present invention will be described in more detail with reference to Examples below. However, the example is only for exemplifying the present invention, and the present invention is not limited thereto.

Experimental Example 1: Control of Lengths of Gradient Section and Uniform Section A grain-oriented electrical steel sheet having a thickness of 0.20 mm, which was cold rolled was prepared. On one surface of the grain-orientation electrical steel sheet, a groove was formed by irradiating a laser beam with a copper mirror by using a fiber continuous laser. In this case, a width W of the laser beam is 25 μm and a length L of the laser beam is 400 μm. A depth ($D_G$) of the groove was 10 μm.

In regard to an energy density of the laser, the gradient section and the uniform section were formed by adjusting an average energy density of the gradient section to 0.107 J/mm$^2$ and the average energy density of the uniform section to 1.07 J/mm$^2$, and when the gradient section is formed, the gradient section is formed by gradually increasing the average energy density. Further, the lengths of the gradient section and the uniform section were controlled differently. This was summarized in Table 1.

Table 1 below shows an iron loss improvement rate and a magnetic flux density deterioration rate. The iron loss improvement rate was calculated as $(W_1-W_2)/W_1$ by measuring an iron loss ($W_1$) of the electrical steel sheet before forming the groove by irradiating the laser and an iron loss ($W_2$) after forming the groove by irradiating the laser. The iron loss was measured as an iron loss value ($W_{17/50}$) if a frequency is 50 Hz when the value of a magnetic flux density is 1.7 Telsa. The magnetic flux density deterioration rate was calculated as $(B_1-B_2)/B_1$ by measuring a magnetic flux density ($B_1$) of the electrical steel sheet before forming the groove by irradiating the laser and a magnetic flux density ($B_2$) after forming the groove by irradiating the laser. As the magnetic flux density, a magnetic flux density ($B_8$) was measured in 800 A/m.

TABLE 1

|  | Energy density increase degree of gradient section (J/mm$^2$/1 mm)) | USL (mm) | GSL (mm) | [GSL]/[USL] | Iron loss improvement rate (%) | Magnetic flux density decrease rate (%) |
|---|---|---|---|---|---|---|
| Example 1 | 0.0594 | 180 | 18 | 0.1 | 10.1 | 4.23 |
| Example 2 | 0.0297 | 180 | 36 | 0.2 | 10.2 | 3.42 |
| Example 3 | 0.0198 | 180 | 54 | 0.3 | 10.4 | 2.23 |
| Example 4 | 0.0149 | 180 | 72 | 0.4 | 10.2 | 2.64 |
| Example 5 | 0.0119 | 180 | 90 | 0.5 | 8.6 | 2.28 |
| Comparative Example 1 | 0.0099 | 180 | 108 | 0.6 | 5.2 | 2.32 |
| Comparative Example 2 | 0.0085 | 180 | 126 | 0.7 | 5.4 | 2.43 |
| Comparative Example 3 | 0.0074 | 180 | 144 | 0.8 | 3.3 | 2.24 |
| Comparative Example 4 | 0.0973 | 180 | 11 | 0.06 | 10.5 | 5.63 |
| Comparative Example 5 | 0.2675 | 180 | 4 | 0.02 | 10.3 | 5.44 |

As shown in Table 1, it can be seen that the iron loss and the magnetic flux density may be optimized by controlling the lengths of the gradient section and the uniform section.

On the contrary, it can be seen that when the lengths of the gradient section and the uniform section are not properly controlled, the iron loss improvement rate or the magnetic flux density deterioration rate deteriorates as compared with an exemplary embodiment of the present invention.

Experimental Example 2: Control of Widths of Gradient Section and Uniform Section A grain-oriented electrical steel sheet having a thickness of 0.20 mm, which was cold rolled was prepared. On one surface of the grain-orientation electrical steel sheet, a groove was formed by irradiating a laser beam with a copper mirror by using a fiber continuous laser. In this case, a width W of the laser beam is 25 μm and a length L of the laser beam is 400 μm. A depth ($D_G$) of the groove was 10 μm.

The gradient section and the uniform section were formed by adjusting the energy density of the laser to be the same as that in Example 5 above, and the length of the gradient section was controlled to 90 mm and the length of the uniform section was controlled to 180 mm. Simultaneously, when the uniform section was formed, the focal depth of the laser was fixed to 125 μm and when the gradient section was formed, the average focal depth was adjusted and the decrease width was adjusted as shown in Table 2 below to differently control the widths of the gradient section and the uniform section. This was summarized in Table 2.

The iron loss and the magnetic flux density were measured by the same method as described above and summarized in Table 2 below.

TABLE 2

|  | Average focal depth of gradient section (μm) | Focal depth decrease width of gradient section (μm/1 mm) | USW (μm) | GSW (μm) | [GSW]/[USW] | Iron loss improvement rate (%) | Magnetic flux density decrease rate (%) |
|---|---|---|---|---|---|---|---|
| Example 5 | 125 | 0 | 50 | 50 | 1 | 8.6 | 2.28 |
| Example 6 | 250 | 2.78 | 50 | 75 | 1.5 | 9.2 | 2.38 |
| Example 7 | 300 | 3.89 | 50 | 87.5 | 1.75 | 10.4 | 2.36 |
| Example 8 | 400 | 6.11 | 50 | 100 | 2 | 10.3 | 2.42 |
| Example 9 | 75 | −1.11 | 50 | 25 | 0.5 | 8.4 | 3.56 |
| Example 10 | 100 | −0.56 | 50 | 37.5 | 0.75 | 8.3 | 4.45 |
| Example 12 | 600 | 10.56 | 50 | 125 | 2.5 | 8.5 | 3.83 |
| Example 13 | 750 | 13.89 | 50 | 150 | 3 | 8.3 | 4.32 |

The present invention is not limited to the exemplary embodiments, but may be manufactured in various different forms and it can be understood by those skilled in the art that the present invention can be executed in other detailed forms without changing the technical spirit or requisite features of the present invention. Therefore, it should be appreciated that the aforementioned embodiments are illustrative in all aspects and are not restricted.

DESCRIPTION OF SYMBOLS

10: Grain-orientation electrical steel sheet
20: Groove
30: Enlarge portion of groove

The invention claimed is:

1. A magnetic domain refining method of a grain-oriented electrical steel sheet, comprising:
   preparing a grain-oriented electrical steel sheet; and
   forming a groove on one surface of the grain-orientation electrical steel sheet by irradiating a laser in a direction intersecting with a rolling direction,
   wherein the forming of the groove includes forming a gradient section and forming a uniform section,
   in the forming of the gradient section, a laser in which an average energy density is in the range of 0.05 to 0.5 J/mm$^2$ is irradiated, and in the forming of the uniform section, a laser in which the average energy density is more than 0.5 J/mm$^2$ to 5 J/mm$^2$ is irradiated, and
   lengths of the gradient section and the uniform section satisfy Equation 1 below:

$$0.1 \le [GSL]/[USL] \le 0.5 \qquad \text{[equation 1]}$$

wherein equation 1, [GSL] represents the length of the gradient section in μm and [USL] represents the length of the uniform section in mm.

2. The magnetic domain refining method of a grain-oriented electrical steel sheet of claim 1, wherein:
   in the forming of the gradient section, an energy density of the laser increases toward boundary portions of the gradient section and the uniform section from an end of the groove.

3. The magnetic domain refining method of a grain-oriented electrical steel sheet of claim 2, wherein:
   in the forming of the gradient section, the energy density of the laser increases to a range of 0.01 to 0.08 J/mm$^2$ per 1 mm toward the boundary portions of the gradient section and the uniform section from the end of the groove.

4. The magnetic domain refining method of a grain-oriented electrical steel sheet of claim 1, wherein:
  in a shape of a laser beam, the width is in the range of 10 to 200 μm and the length may be in the range of 300 to 5000 μm.

5. The magnetic domain refining method of a grain-oriented electrical steel sheet of claim 1, wherein:
  in the forming of the gradient section, a focal depth of the laser is more than 150 μm to 500 μm, and in the forming of the uniform section, the focal depth of the laser is in the range of 0 to 150 μm.

6. The magnetic domain refining method of a grain-oriented electrical steel sheet of claim 5, wherein:
  in the forming of the gradient section, the focal depth of the laser decreases toward the boundary portions of the gradient section and the uniform section from the end of the groove.

* * * * *